(12) United States Patent
Albou

(10) Patent No.: US 7,261,449 B2
(45) Date of Patent: Aug. 28, 2007

(54) LIGHTING MODULE GIVING A LIGHT BEAM WITH CUT-OFF LINE FOR A MOTOR VEHICLE HEADLIGHT, AND A HEADLIGHT COMPRISING SUCH A MODULE

(75) Inventor: Pierre Albou, Paris (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 11/408,097

(22) Filed: Apr. 20, 2006

(65) Prior Publication Data

US 2006/0239020 A1      Oct. 26, 2006

(30) Foreign Application Priority Data

Apr. 21, 2005    (FR) .................................. 05 04019

(51) Int. Cl.
*F21V 7/00*      (2006.01)
(52) U.S. Cl. ..................... 362/518; 362/520; 362/308; 359/364
(58) Field of Classification Search ................ 362/516, 362/520, 518, 296, 308; 359/641, 364, 726
See application file for complete search history.

(56) References Cited

U.S. PATENT DOCUMENTS

| | | | | |
|---|---|---|---|---|
| 4,811,174 A | * | 3/1989 | Kanzler et al. ............. | 362/538 |
| 6,554,460 B1 | * | 4/2003 | Saladin ........................ | 362/539 |
| 6,997,587 B2 | | 2/2006 | Albou | |
| 2002/0080615 A1 | | 6/2002 | Marshall et al. | |
| 2003/0214815 A1 | | 11/2003 | Ishida et al. | |
| 2004/0156209 A1 | | 8/2004 | Ishida | |
| 2004/0175072 A1 | * | 9/2004 | Lam et al. .................... | 385/33 |

FOREIGN PATENT DOCUMENTS

| | | |
|---|---|---|
| DE | 103 18 952 | 4/2003 |
| EP | 1 357 333 | 10/2003 |
| EP | 1 357 334 | 10/2003 |
| FR | 2 851 030 | 8/2004 |

* cited by examiner

*Primary Examiner*—Thomas M. Sember
*Assistant Examiner*—Julie A. Shallenberger
(74) *Attorney, Agent, or Firm*—Jacox Meckstroth & Jenkins

(57) ABSTRACT

A lighting module able to give a light beam with cut-off line for a motor vehicle headlight, comprising a light source, a reflector, a dioptre serving as an exit lens or an exit lens, and a reflective folder. The light source is combined with a collimator in order to give a beam that can be assimilated to a parallel beam, substantially orthogonal to an exit plane of the collimator. The reflector and the dioptre or lens may be combined in a single piece made from transparent material, and the surface of the reflector and that of the folder means work in total reflection according to an air/transparent material interface.

26 Claims, 4 Drawing Sheets

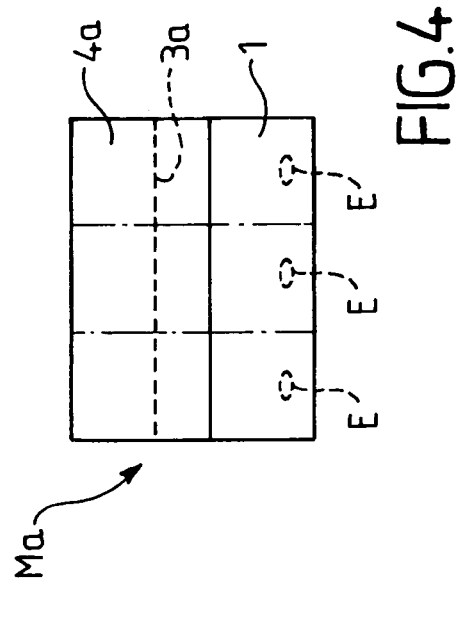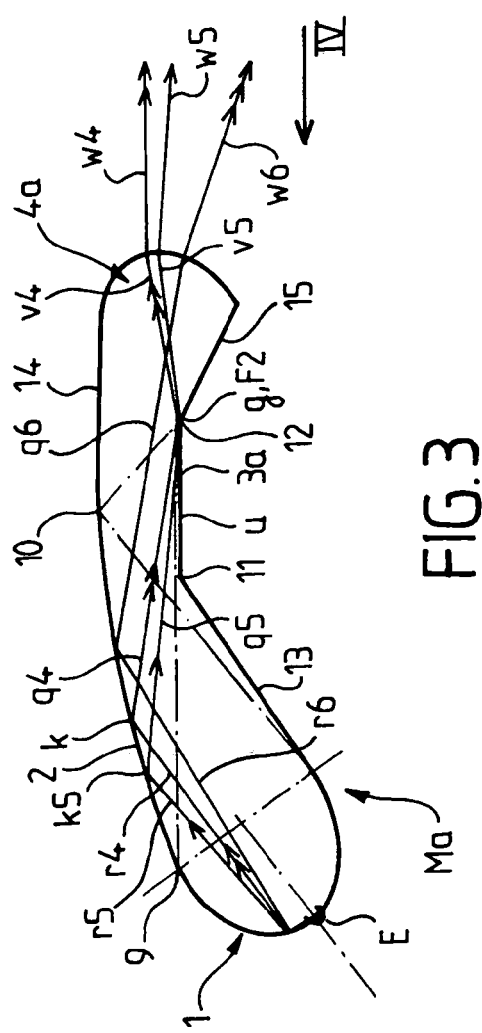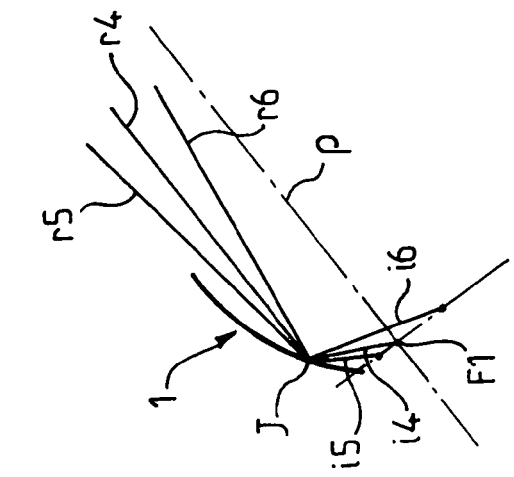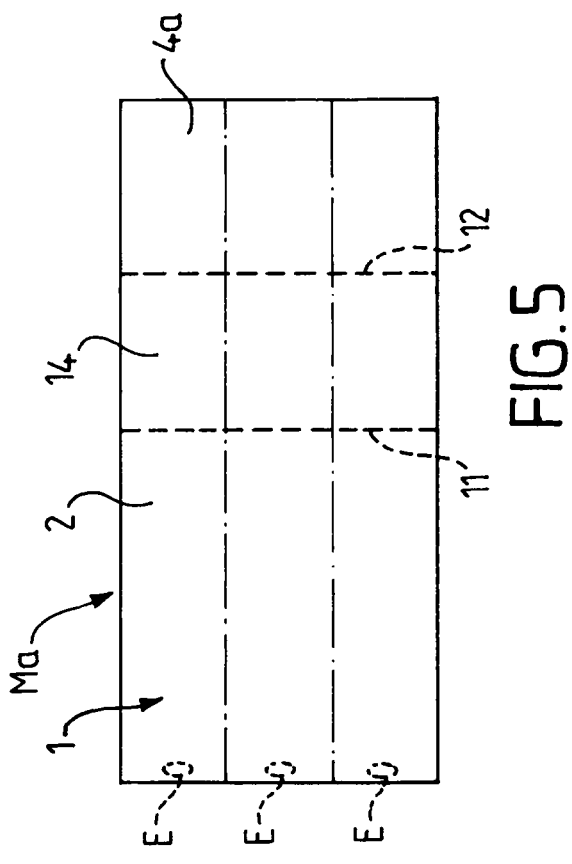

LIGHTING MODULE GIVING A LIGHT BEAM WITH CUT-OFF LINE FOR A MOTOR VEHICLE HEADLIGHT, AND A HEADLIGHT COMPRISING SUCH A MODULE

FIELD OF THE INVENTION

The invention relates to a lighting module able to give a light beam with cut-off line for a motor vehicle headlight, of the type that comprises:
- a light source, in particular formed by at least one light emitting diode,
- a reflector,
- a dioptre or an exit lens,
- and a reflecting folder means, one end of which, situated in the vicinity of the focus/line of foci of the lens/dioptre determines the cut-off line of the beam emerging from the module.

BACKGROUND OF THE INVENTION

A lighting module is known, for example, from EP 1 357 334. The embodiment illustrated by FIG. 4 corresponds to a solid optical piece that can be produced by molding from transparent material. However, to allow reflection of the light rays emitted by the source in the reflection volume delimited by the reflector, the external surface of the reflector and folder means is coated with a reflective material.

The placing of the reflective coating, for example by aluminizing, is relatively tricky and expensive.

The aim of the invention is in particular to provide a lighting module giving a beam with cut-off line which requires no reflective coating, in particular no aluminizing, and which requires only a few assembly operations, so as to eliminate the critical operations and tolerances.

This is because an operation of deposition of a reflective coating creates losses by specular reflection. An assembly operation creates imprecisions in relative positioning of the various parts.

SUMMARY OF THE INVENTION

According to the invention, a lighting module of the type defined above is such that:
- the light source is combined with a collimator in order to give a beam that can be assimilated to a parallel beam substantially orthogonal to an exit plane of the collimator,
- the reflector, for example of the parabolic type, receives the parallel exit beam from the collimator in order to make it substantially converge towards a focus site situated at the edge of the folder means,
- the dioptre or lens vertically diverts the light rays coming from the reflector and/or folder means so as to form the cut-off line,
- the reflector and the dioptre or lens are combined in a single piece made from transparent material, and the surface of the reflector and that of the folder means work in total reflection according to an interface between air and transparent material.

Preferably, the focus site situated at the edge of the folder means is merged with or in the vicinity of the focus or the line of foci of the lens/dioptre.

"Dioptre or lens" means a dioptre serving as a lens, or a lens in the strict sense of the term. It may also be a case of a plurality of associated dioptres.

"Beam that can be assimilated to a parallel beam" means a beam that is roughly parallel, a person skilled in the art knowing that a beam is truly parallel only for a theoretical point light source (in reality it has a tendency to be slightly divergent).

The reflector, as detailed below, is not necessarily of the parabolic type, in particular in the case where a curved beam is created, in accordance with an example detailed later in the text (case 3).

The "focus site" of the folder means can be defined as the subset of the space through which pass all the rays of the beam that can be assimilated to a parallel beam reflected by the reflector. Advantageously, it can take various forms: it can be a case of:
- a linear edge of the folder means,
- a curved edge of the folder means,
- an edge associating one or more linear parts with one or more curved parts of the folder means,
- a point on the folder means.

Advantageously, the reflector and dioptre/lens work without, or substantially without, any reflective coating, the drawbacks of which were seen above. The presence of a coating, in particular in the non-optically active areas of the assembly for aesthetic reasons, or on a reduced portion of the zones in order to very precisely adjust its optical behaviour, is however not excluded from the scope of the invention. An important characteristic of the invention does however remain that any coating, reflective or not, becomes optional, and that preferably, the aforementioned assembly is completely eliminated.

Preferably, the collimator forms with the reflector and dioptre/lens a single piece made from transparent material.

The transparent material of the module has a refractive index greater than $\sqrt{2}$. This material advantageously consists of PMMA (polymethyl methacrylate).

The folder means is advantageously formed by a substantially horizontal surface part constituting an interface between the transparent material and air.

According to a first possibility, the light source is lower than the folder means and the light coming from the source is directed upwards in order to be reflected by the reflector downwards in the direction of the folder means.

In the context of the present text, the terms "up", "down", "horizontal", "vertical" are to be understood as indications of orientation when the module is disposed in the normal position of use, once incorporated in a lighting device mounted in a vehicle.

According to a variant, the light source is higher than the folder means and the light coming from the source is directed downwards.

The reflector can be a cylindrical surface having a parabola as directrix, the focus of the reflector then being formed by a straight line segment parallel to the generatrices of the cylinder, the edge of the folder means being rectilinear and parallel to the generatrices of the cylinder. The lens/dioptre is itself formed by a cylindrical surface with a cross section along a curve convex towards the outside, and having generatrices parallel to those of the reflector.

In a variant, the reflector can be a paraboloid of revolution with a point focus situated at the edge of the folder means.

The folder means can have a curved edge and the surface of the reflector is determined according to the curved edge of the folder means.

Several modules can be juxtaposed, in particular the direction of the generatrices of the lens/dioptre when the latter is a portion of a cylinder.

Advantageously, the light source used is a light emitting diode or a plurality of light emitting diodes.

By juxtaposition of several modules, it is possible to produce a cut-off line comprising a horizontal segment and a segment inclined to the horizontal.

In the case where the reflector is of the paraboloid of revolution type, with a point focus, the folder means can form a dihedron, with two faces forming an angle so that the cut-off line of the beam issuing from the module has itself an angle with a substantially horizontal part and an inclined part.

The invention also relates to a headlight for a motor vehicle comprising at least one module as defined above.

The invention consists, apart from the provisions disclosed above, of a certain number of other provisions which will be dealt with more explicitly below with regard to example embodiments described with reference to the accompanying drawings, but which are in no way limiting. In these drawings:

BRIEF DESCRIPTION OF THE DRAWINGS

FIG. 3 is vertical section of a module according to the invention with a horizontal folder means and a light source situated lower than the folder means.

FIG. 4 is a right-hand view with respect to FIG. 3.

FIG. 5 is a plan view of the module in FIG. 3, with the rectilinear folder means edge parallel to the generatrices of the reflector.

FIG. 6 is a diagram, to a larger scale, of a detail of FIG. 3 illustrating various incident rays on the reflector.

DESCRIPTION OF THE PREFERRED EMBODIMENTS

It should be stated that the invention aims to provide a lighting module, preferably with light emitting diode, providing a light beam with cut-off line, with a folder means without reflective coating, that is to say functioning by internal reflection.

The beam with cut-off line can be a fog beam, or a part of a dipped beam, or a beam for an AFS function. In these particular cases, mentioned below, the cut-off line can be formed by two straight line segments forming an angle according to the dipped beam.

Figure 1:
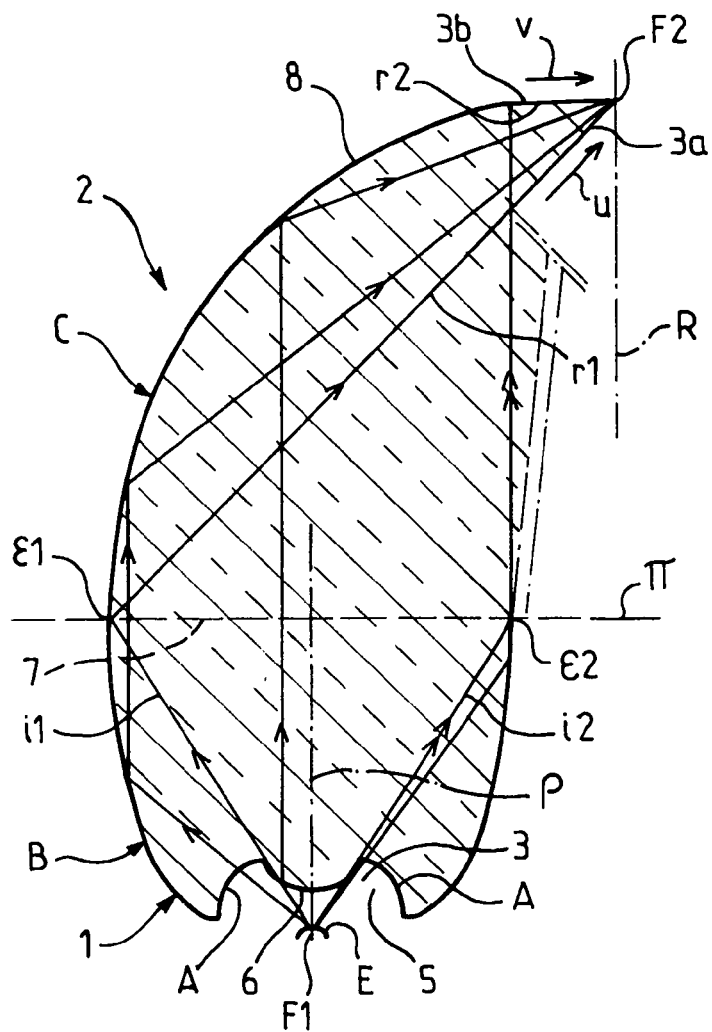
FIG. 1 is a schematic section of the collimator and reflector of a module according to the invention, through a plane passing through the optical axis of the collimator.
Figure 2:
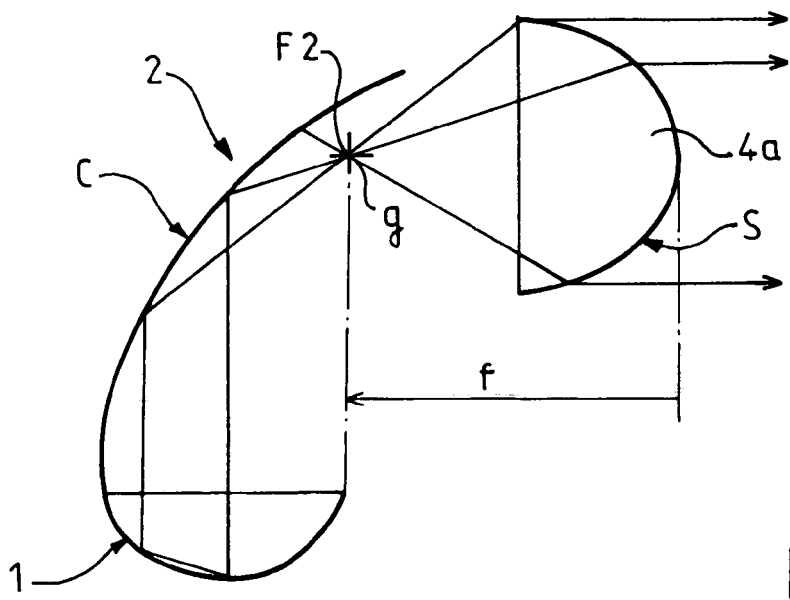
FIG. 2 is a schematic section, to a smaller scale, of the module through a vertical plane passing through the optical axis of the collimator, the lens being depicted symbolically, whilst the collimator and reflector are partially traced.
Figure 9:
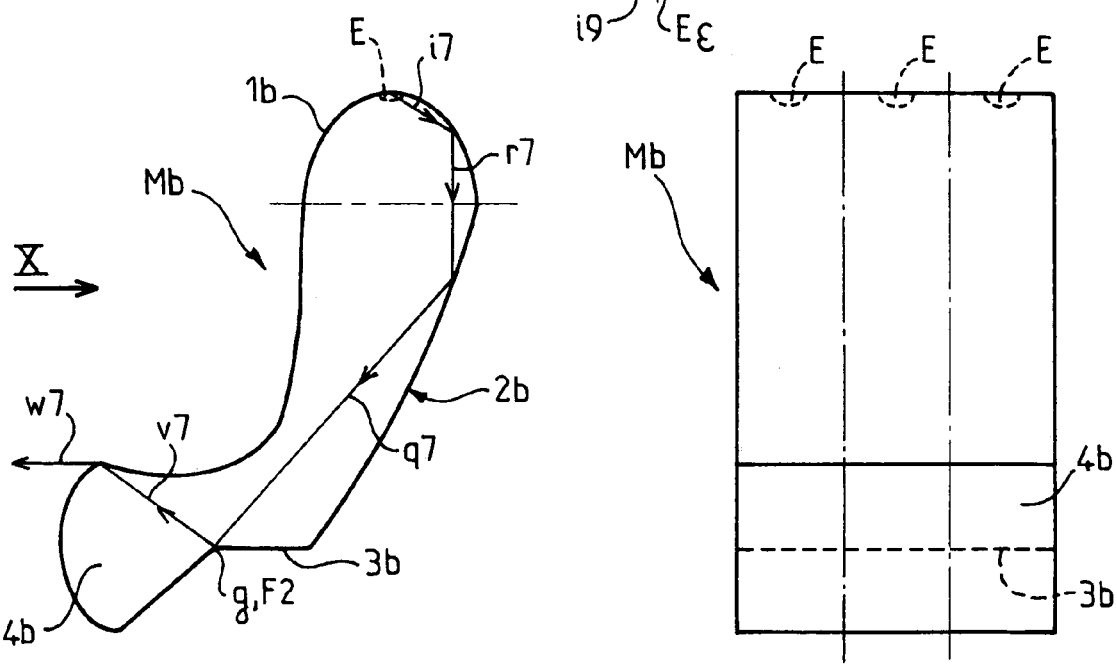
FIG. 9 is a vertical section of a variant embodiment with folder means situated lower than the light source, whose light is directed downwards.

The diagrams in FIGS. 1 and 2, supplemented by FIGS. 3 and 9, show that the invention combines a collimator 1, a reflector 2 of the paraboloid type functioning by internal reflection, a folder means 3a (FIG. 3) or 3b (FIG. 9) also functioning by internal reflection, and a lens 4a (FIG. 3) or 4b (FIG. 9).

The collimator 1 (FIG. 1) comprises a focus F1 at which a light source E is placed, preferably a light emitting diode. The collimator 1 has an optical axis ρ, disposed vertically according to FIG. 1, and has at its bottom part a cavity 3 delimited in the vicinity of the optical axis ρ by a surface 6 convex in the direction of the focus F1. The surface 6 defines a lens having this focus F1. The surface 6, generally of revolution about the optical axis ρ, is surrounded by a surface of revolution A concave in the direction of the focus F1. The surface A is preferably a spherical surface A centred on F1.

The external surface of the collimator 1 is that of a paraboloid having a F1 as focus. The collimator 1 is produced from transparent material having a refractive index equal to or greater than $\sqrt{2}$, whilst the cavity 5 is situated in the air. A light ray issuing from the focus F1 passes through the surface A without being diverted and undergoes internal reflection on the surface B separating the transparent material from the air, in order to emerge parallel to the optical axis ρ, orthogonally to the exit face 7 of the collimator situated in a plan Π orthogonal to the axis ρ.

The light rays coming from F1 and falling on the face 6 of the lens are refracted parallel to the optical axis ρ.

The exit beam from the collimator 1 is a beam parallel to the optical axis ρ.

Some light emitting diodes can be supplied with an integral collimator and can then be used with a planar entry face parallel to the plane Π, perpendicular to the beam.

If the surface A is not a sphere centred on the focus F1, then the suitable surface B is not exactly a paraboloid. If the surface A is frustoconical, which is the most simple shape to be produced at this point, it is possible to determine a surface that allows collimation in total reflection.

The reflector 2 is of the paraboloid type and has a surface 8 convex towards the outside constituting the interface with the material of the reflector and the air. Preferably, the material of the reflector 2 is the same as that of the collimator 1, and has a refractive index equal to or greater than $\sqrt{2}$. This material is advantageously PMMA (polymethyl methacrylate).

The reflector 2 can be formed by a piece distinct from the collimator 1 and connected to the latter, in particular by adhesive bonding, along the plane Π of the exit face 7. Preferably, the collimator 1 and reflector 2 form a single piece.

The curve C, corresponding to the section through the reflector 2 through the plane in FIGS. 1 and 2, is a parabola of axis R parallel to the optical axis ρ of the collimator, and having as its focus a point F2 situated on the axis R. The beam of rays parallel to R, coming from the collimator, is reflected so as to converge towards the focus F2.

The limit rays r1, r2 of the beam converging towards F2 correspond to the limit incident rays i1, i2 falling respectively on the edges ε1 and ε2 of the face 7.

The segment u of the ray r1 situated between the focus F2 and the straight line parallel to the axis ρ passing through the point ε2 will serve to determine a first folder means surface 3a (FIG. 3). The segment v, corresponding to the reflected ray r2, will serve to determine a second possible folder means surface 3b (FIG. 9).

By crossing the collimator 1 with the reflector 2 of the paraboloid type, the equivalent of an ellipsoid is obtained with two foci F1 and F2. All the internal reflections are total, at least for rays issuing from the centre of the source E situated at the focus F1.

Several possibilities are offered for the reflector 2:

Case 1

The reflector 2 can be a parabolic cylinder with axis and generatrices perpendicular to the plane of FIG. 1, having the curve C as directrix; in this case, the convergence of the reflected beam takes place along a straight line segment perpendicular to the plane of FIG. 2 and passing through the point F2.

Case 2

According to another possibility, the paraboloid 2 is of revolution and is obtained by causing the curve C to rotate about the axis R. The focus F2 is then at one point.

Case 3

The reflector 2 can be a more complex surface than a paraboloid and the curve C then simply represents the cross section of this surface through the plane in FIG. 2.

In general, the collimator 1 remains a volume of revolution of axis ρ, just like the luminance indicatrix of the source E placed at F1.

FIG. 2 illustrates, in the form of the curve S, the section through a plane parallel to the axis R of the reflector 2 of a lens 4a of focal distance f and whose focus is merged with the focus F2 itself merged with a point g that will be dealt with below.

FIG. 3 depicts in section through a vertical plane a module Ma according to the invention obtained by combining in a single piece the lens 4a, the reflector 2 and the collimator 1. The module Ma corresponds to Case 1 of a reflector 2 formed by a parabolic cylinder with generatrices perpendicular to the plane of the figure. The wall of the reflector 2, constituting the interface with the air, works in total reflection and extends between the points 9 and 10.

The rectilinear segment u constituting the folder means 3a also works in total reflection. The folder means 3a extends between the points 11 and 12. The surface 13, which extends between the collimator 1 and the folder means 3a, does not have any optical function and can be chosen according to purely practical considerations; the same applies to the surface 14 extending between the end of the reflector 2 and the lens 4a, and to the surface 15 extending between the front edge of the folder means 3a and the lens 4a.

A ray i4 (see FIG. 6) coming from the focus F1 and falling at a point J on the surface of the collimator is reflected at r4 parallel to the axis ρ of the collimator. This ray falls on a point k (FIG. 3) of the reflector 2 and is reflected, by internal reflection, along a ray q4 that falls on the front edge of the folder means 3a passing through the focus F2. This ray q4 is reflected, by internal reflection, on the front edge of the folder means 3a along a ray v4 that emerges from the lens 4a along the ray w4 parallel to the folder means 3a, that is to say parallel to the horizontal plane.

Since the light source E is not absolutely at one point, light rays coming from points separate from F1 also fall at J as illustrated in FIG. 6. A ray i5 coming from a point closer to J than the focus F1 falls on the surface of the collimator 1 at an angle of incidence greater than i4. The ray i5 is reflected along a ray r5 situated above r4 and strikes the reflector 2 at a point k5. The ray r5 is reflected along a ray q5 that falls on the folder means 3a at the rear of the front edge passing through F2. The ray q5 is reflected along a ray v5 and leaves the lens 4a along a ray w5 inclined downwards, below the horizontal, since the ray v5, reflected on 3a at the rear of F2, cuts the focal plane of the lens 4a above the focus F2.

A ray i6 coming from a point further than away from J than F1 is first of all reflected along r6, and then on the reflector 2 along a ray q6 directed downwards, passing above the front edge of the folder means and refracted at the exit from of the lens 4a along w6.

Thus, the light beam leaving the lens 4a and coming from the source E is situated below a horizontal line corresponding to the image of the front edge of the folder means 3a by the lens 4a.

An elementary module corresponds to a light source E. Several modules, for example three modules can be juxtaposed and form only a single piece comprising three sources E derived by translation from one another parallel to the generatrices of the cylindrical lens 4a and the cylindrical paraboloid 8.

The module Ma in FIGS. 3, 4 and 5 uses the folder means 3a corresponding the vector u of FIG. 1.

Figure 10:
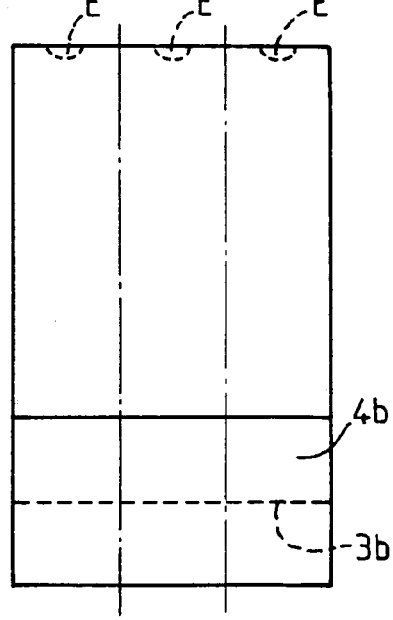
FIG. 10 is a left-hand view with respect to FIG. 9.

According to another possibility illustrated in FIGS. 9 and 10, a module Mb uses as a folder means the interface 3b corresponding to the segment v of FIG. 1. The light source E is disposed above the folder means 3b and illuminates downwards. The collimator 1b is situated at the top part and is oriented downwards. The light beam leaving the collimator 1 is parallel to the vertical. A ray i7 issuing from the focus is returned by the collimator along r7 reflected vertically downwards, and falls on the material/air interface of the reflector 2b. The ray i7 is returned by internal reflection along q7 in order to fall on the front edge of the folder means 3b, and be reflected at v7. The ray leaves the lens 4b along w7, parallel to the horizontal direction.

The surface of the lens 4b is cylindrical with horizontal generatrices, perpendicular to the plane of the figure. In the example in question, the module Mb comprises three sources E as illustrated in FIG. 10.

The examples of modules in FIGS. 3 and 9 correspond to a folder means 3a, 3b, whose front edge is a rectilinear segment, parallel to the generatrices of the parabolic reflector 2, which makes it possible to use several light sources E per module.

According to the case 2 mentioned previously, the reflector consists of a paraboloid of revolution about the axis R. It is then possible to use only one light source E per module; on the other hand it is possible to form a cut-off line at an angle comprising a horizontal segment and a segment inclined to the horizontal, for example by 15° according to the regulations, or any other non-rectilinear form of cut-off line. In this case, the lens 4a preferably has an exit surface about the optical axis y of the system defined a little later.

In more general terms, as mentioned previously with regard to Case 3, the three-dimensional reflector 2 can be a more complex surface than a paraboloid. The curve C is then simply the section through the reflector through the plane of the sheet.

The front edge of the folder means can consist of a continuous derivable curve G (see FIG. 8) passing through F2 and situated in a plane orthogonal to the plan of FIG. 1.

Let g be a point in question on the curve G; it is necessary to determine in a plane P1, orthogonal to the curve G at the point g, the arc χ of the curve that represents the intersection by the plane P1 of a reflector 2a.

Figure 8:
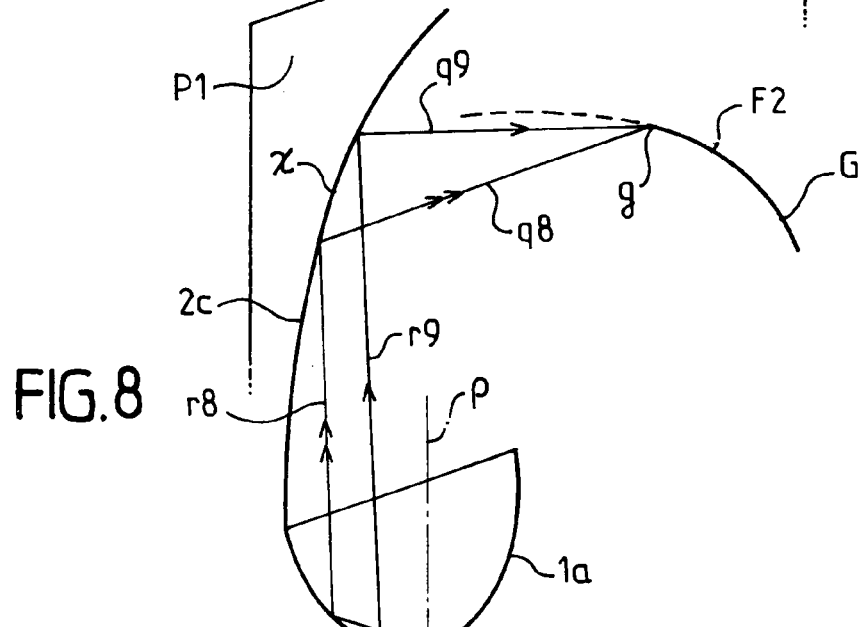
FIG. 8 is a diagram illustrating the construction of the surface of the reflector when the edge of the folder means is formed by a curve according to FIG. 7.

The curve $\chi$ must be such that parallel rays r8, r9 coming from the collimator 1a, the cross section of which through the plane P1 is shown in FIG. 8, converge, after reflection on the curve $\chi$, towards g along the reflected rays q8, q9.

The curve $\chi$ is calculated so that the optical path of the rays coming from the collimator 1a and reflected by the curve $\chi$ as far as a point g is constant.

The calculation is set out more completely below.

The continuous derivable curve G passing through $F_2$, entirely contained in a plane perpendicular to that of FIG. 1, is considered. For any point g on G, the normal to G at g is denoted $\vec{n}(g)$ such that $\vec{n}(g) \cdot \vec{y} > 0$, where $\vec{y}$ is a directing vector of the optical axis of the system (see below). It is assumed that:

$\exists d \in \mathfrak{R}_+^*$ such that $\forall (g,g') \in G^2, g \neq g'$, $(g, \vec{n}(g)) \cap (g', \vec{n}(g')) = \emptyset$ and $d((g, -\vec{n}(g)) \cap (g', -\vec{n}(g')), g) \geq d$ and $d((g, -\vec{n}(g)) \cap (g', -\vec{n}(g')), g') \geq d$ or $\forall (g,g') \in G^2, g \neq g'$, $(g, -\vec{n}(g)) \cap (g', -\vec{n}(g')) = \emptyset$ and $d((g, \vec{n}(g)) \cap (g', \vec{n}(g')), g) \geq d$ and $d((g, \vec{n}(g)) \cap (g', \vec{n}(g')), g') \geq d$ where $(p, \vec{v})$ designates a half straight line of origin p and directing vector $\vec{v}$ and $d(p_1, p_2)$ the Euclidian distance from $p_1$ to $p_2$.

Under these conditions, for any point g of G, let $\vec{t}(g)$ a vector tangent to G at g and $\pi(g)$ the plane perpendicular to $\vec{t}(g)$ containing g. A reflector $\chi$ is then defined such that $\forall g \in G, \forall p \in \chi \cap \pi(g), d(\Pi, p) + d(p, g) = K$ where $\Pi$ is an arbitrary plane perpendicular to $\rho$ and K a characteristic constant.

(For $\chi$ to exist as the surface of a physical reflector, it is necessary for $\Pi$, K to maintain suitable relationships; in addition, additional constraints apply so that $\chi$ recovers all the rays issuing from the collimator. If d is assumed to be sufficiently great and $\Pi$ placed at the top face of the collimator, it is then possible to choose $K=d(\epsilon, F_2)$, where $\epsilon$ is the point on the collimator belonging to $\Pi$ furthest away from $F_2$, the intersection of G and of the plane of the sheet, the plane containing the axis $\rho$ and the optical axis of the system; a suitable choice of $F_2$ and of the curve G in general makes it possible to ensure collection of all the rays.)

G is the characteristic curve of the system and amounts to a straight line segment in Case 1 and to the point $F_2$ in Case 2. G (subject to the conditions of existence of the reflector given above) makes it possible to control the horizontal distribution of the light.

In practice, G has been constructed by choosing $F_2$, and then imposing the direction of the normal as a function of the x-axis (which more intuitively reflects the horizontal spread given to the beam). G is then the solution of a differential equation.

The rest of the construction of the system is then implemented simply in 2D in the planes $\pi(g)$, for all the points g of G, as is shown in FIG. 2, f being a positive arbitrary constant (if $\exists (g, g') \in G^2, g \neq g'$, such that $(g, \vec{n}(g)) \cap (g', \vec{n}(g')) \neq \emptyset$, it is also necessary for f<d).

$S \cap \pi(g)$ is stigmatic in $\pi(g)$ between g and infinity. S designates the surface of the lens 4a.

Optical axis and plane of G: two possibilities:

$\alpha$ $y=(F_2, \vec{u})$ and the plane of G is $\Gamma = (F_2, \vec{u}, \vec{x})$ $\beta$ $y=(F_2, \vec{v})$ and the plane of G is $\Gamma = (F_2, \vec{v}, \vec{x})$ (simple particular case studies: $\vec{v} \perp \rho$).

Such a system does not however create a beam with cut-off line, because of the extent of the source. It is found however that a planar surface contained in $\Gamma$, of edge G and extending along $-y$, as far as the envelope of the rays issuing from the collimator, works in total reflection with the rays which reach it and which do not pass through G). Such a surface then acts as an aliasing mirror and ensures the presence of a cut-off line, which is the image through S of the edge formed by the material along G.

It is possible to consider various modules: if their characteristic curves $G_1, \ldots, G_n$ are contained in the same plane, if $$\bigcup_{i=1}^{n} G_i$$

is a continuous derivable curve and of the "focal lengths" $f_1, \ldots, f_n$ are all identical, then it is possible to assemble the modules so that $$\bigcup_{i=1}^{n} S_i$$

is a smooth surface (in Case 1 for example, the reflecting part, folder means, and exit surface are in the form of an extruded element—the complete part cannot be extruded because of the collimator parts, which are parts of revolution about axes parallel to $\rho$).

Figure 7:
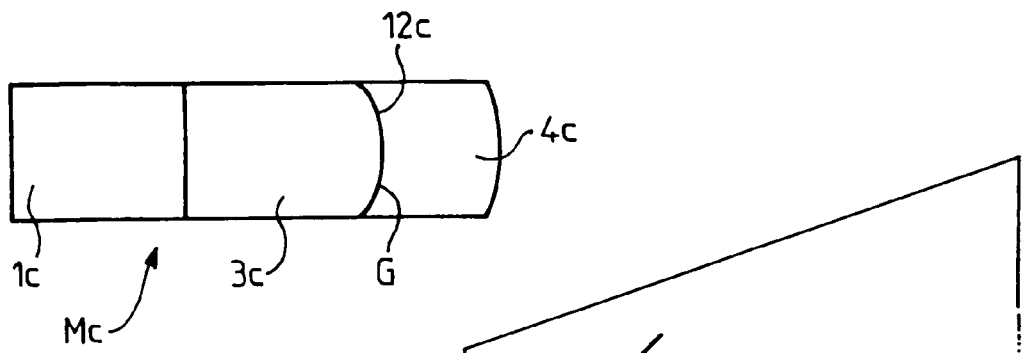
FIG. 7 shows, similarly to FIG. 5, a module with folder means whose edge is formed by a curved line convex towards the outside.

FIG. 7 is view from below of a module Mc where the front edge of the folder means 3c is delimited by a curve G. The lens 4c has a front face that is no longer cylindrical with rectilinear generatrices but where the section through a horizontal plane is a curve convex towards the outside.

The beam obtained with a module where the front edge of the folder means is formed by a convex curve G is more spread out.

Figure 11:
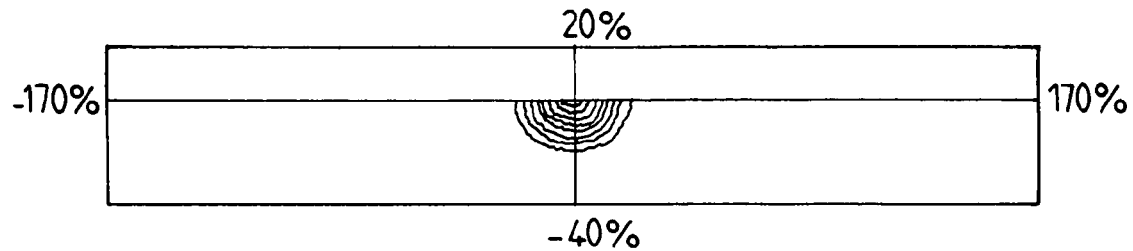
FIGS. 11 to 13 illustrate the isolux curves obtained with various modules according to the invention.

FIG. 11 is a diagram illustrating the isolux curves obtained with a module where the reflector 2 corresponds to Case 1, that is to say a reflector 2 in the form of the parabolic cylinder with horizontal generatrices. As shown by FIG. 11, the cut-off line is horizontal.

Figure 12:
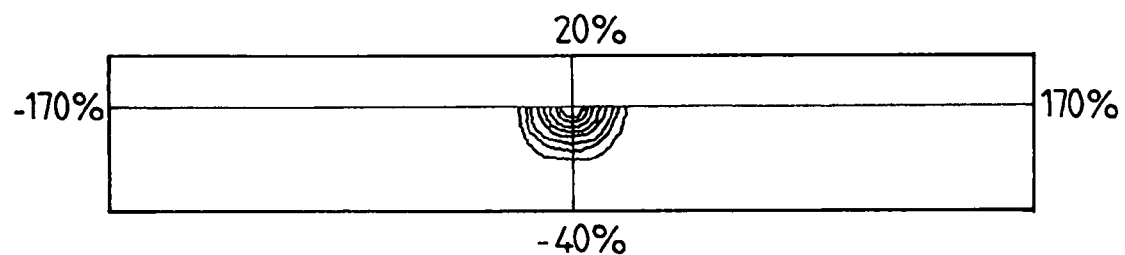

FIG. 12 corresponds to Case 2 where the reflector 2 is paraboloid of revolution having F2 as a point focus. The isolux curves resemble those of FIG. 11.

Figure 13:
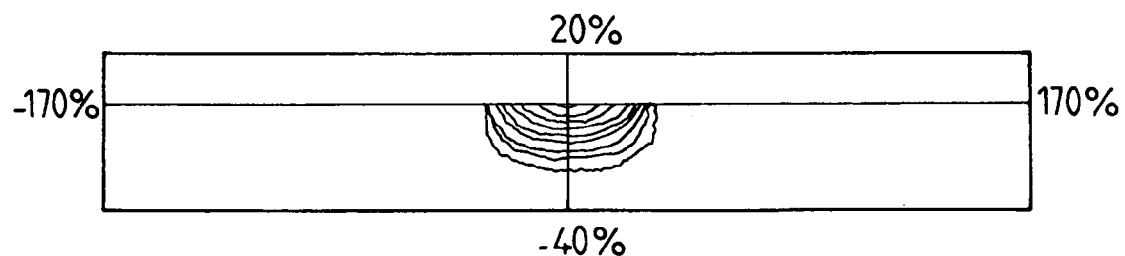

FIG. 13 corresponds to a module where the folder means is limited by a curve G convex towards the front. The cut-off line remains horizontal, but the spread of the beam is greater, because of the curvature of the folder means.

What is claimed is:

1. A lighting module able to give a light beam with cut-off line for a motor vehicle headlight, comprising:
   a light source;
   a reflector;
   an optical surface or lens;
   and a reflective folder means;
   wherein:
   said light source is combined with a collimator in order to give an exit beam substantially orthogonal to an exit plane of the collimator;
   said reflector receives the said exit beam from said collimator in order to make it substantially converge towards a focus site situated at the edge of said folder means;
   said optical surface or lens vertically diverts the light rays coming from said reflector and/or said folder means so as to form said cut-off line;
   said reflector and said optical surface or lens are combined in a single piece made from transparent material, and the surface of said reflector and that of said folder means work in total reflection according to an interface between air and transparent material.

2. The lighting module according to claim 1, wherein said focus site is a linear edge or curve or is a point on said folder means.

3. The lighting module according to claim 1, wherein said collimator forms, with said reflector and said optical surface or lens, a single piece made from transparent material.

4. The lighting module according to claim 1, wherein said transparent material of said module has a refractive index greater than $\sqrt{2}$.

5. The lighting module according to claim 3, wherein said transparent material comprises PMMA (polymethyl methacrylate).

6. The lighting module according to claim 1, wherein said folder means is formed by a part of a horizontal surface constituting an interface between said transparent material and the air.

7. The lighting module according to claim 6, wherein said light source is lower than said folder means and the light coming from said source is directed upwards in order to be reflected by said reflector downwards in the direction of said folder means.

8. The lighting module according to claim 6, wherein said light source is higher than said folder means and the light coming from said source is directed downwards in order to be reflected by said reflector downwards in the direction of said folder means.

9. The lighting module according to claim 1, wherein said reflector is a cylindrical surface having a parabola as its directrix, the focus of said reflector being formed by a segment of straight line substantially parallel to the generatrices of said cylindrical surface, an edge of said folder means being substantially rectilinear and parallel to the generatrices of said cylindrical surface.

10. The lighting module according to claim 9, wherein said optical surface or lens is itself formed by a cylindrical surface with a cross section along a curve convex towards the outside, and having generatrices substantially parallel to those of said reflector.

11. The lighting module according to claim 1, wherein said reflector is a paraboloid of revolution with a point focus situated on the edge of said folder means.

12. The lighting module according to claim 1, wherein said folder means has a curved edge and a surface of said reflector is determined according to said curved edge of said folder means.

13. The lighting module according to claim 1, wherein several modules are juxtaposed, in particular in the direction of the generatrices of said optical surface or lens.

14. The lighting module according to claim 1, wherein said folder means forms a dihedron with two faces forming an angle so that a cut-off line of said beam issuing from the module has itself an angle with a horizontal part and an inclined part.

15. The lighting module according to claim 1, wherein said light source is a light emitting diode or a plurality of light emitting diodes.

16. The headlight for a motor vehicle, comprising at least one module according to claim 1.

17. A lighting module for use on a vehicle, said lighting module comprising:
   a collimator for receiving light from a light source and for collimating said light in order to provide an exit beam that is generally orthogonal to an exit plane of said collimator;
   a reflector for receiving said exit beam and for reflecting said exit beam to provide a reflector beam of light rays toward a focus site; and
   an optical surface or lens for receiving said reflector beam of light rays and diverting them to provide a cut-off line;
   said reflector and optical surface or lens being a one-piece construction made from transparent material.

18. The lighting module as recited in claim 17 wherein said lighting module further comprises a folder situated between said optical surface or lens and said light source.

19. The lighting module as recited in claim 18 wherein said focus site is a linear edge, curve or point on said folder.

20. The lighting module as recited in claim 17 wherein said collimator, said reflector and said optical surface or lens is a single piece construction made from transparent material.

21. The lighting module according to claim 20, wherein said transparent material of said lighting module has a refractive index greater than $\sqrt{2}$.

22. The lighting module according to claim 20, wherein said transparent material comprises PMMA (polymethyl methacrylate).

23. The lighting module according to claim 17, wherein said reflector is a paraboloid of revolution with a point focus situated on the edge of a folder means.

24. The lighting module according to claim 23, wherein said folder means has a curved edge and a surface of said reflector is determined according to said curved edge of said folder means.

25. The lighting module according to claim 17, wherein said light source is a light emitting diode or a plurality of light emitting diodes.

26. The headlight for a motor vehicle, comprising at least one module according to claim 17.

* * * * *